United States Patent
Mühlberger et al.

(10) Patent No.: US 6,422,651 B1
(45) Date of Patent: Jul. 23, 2002

(54) STEPPING MECHANISM FOR AN AUTOMOBILE SEAT

(75) Inventors: Joachim Mühlberger, Grünstadt; Kai Schumann, Rieschweiler, both of (DE)

(73) Assignee: Keiper GmbH & Co., Kaiserslautern (DE)

(*) Notice: Subject to any disclaimer, the term of this patent is extended or adjusted under 35 U.S.C. 154(b) by 0 days.

(21) Appl. No.: 09/658,702

(22) Filed: Sep. 8, 2000

(30) Foreign Application Priority Data

Sep. 9, 1999 (DE) .......................... 199 42 994

(51) Int. Cl.$^7$ ................................ B60N 2/16
(52) U.S. Cl. ................ 297/344.12; 297/344.15; 248/292.12; 248/292.13; 248/157; 248/422
(58) Field of Search ............... 297/344.15, 344.12; 248/157, 422, 421, 292.12, 292.13

(56) References Cited

U.S. PATENT DOCUMENTS

| | | |
|---|---|---|
| 4,063,626 A | 12/1977 | Solomon |
| 4,143,905 A | 3/1979 | Hensel et al. |
| 4,576,412 A | 3/1986 | Terada |
| 4,762,366 A | 8/1988 | Bauer et al. |
| 4,997,223 A | 3/1991 | Croft |
| 5,109,963 A | 5/1992 | Husted et al. |
| 5,460,253 A | 10/1995 | Ritter et al. |
| 5,547,158 A * | 8/1996 | Uchimoto et al. ...... 248/421 X |
| 5,568,908 A * | 10/1996 | Kisiel ............. 248/422 X |
| 5,590,931 A | 1/1997 | Fourrey et al. |
| 5,863,098 A * | 1/1999 | Kojima et al. ......... 248/421 X |
| 6,212,965 B1 | 4/2001 | Hochmuth |
| 6,250,705 B1 * | 6/2001 | Zuch ............... 297/216.1 X |
| 6,253,894 B1 | 7/2001 | Schumann et al. |
| 6,290,198 B1 * | 9/2001 | Kojima et al. ........ 248/421 X |

FOREIGN PATENT DOCUMENTS

| | | |
|---|---|---|
| DE | 2659308 A1 | 7/1978 |
| DE | 3134298 A1 | 3/1983 |
| DE | 35 09 211 A1 | 9/1985 |
| DE | 36 08 858 A1 | 10/1987 |
| DE | 3616164 A1 | 11/1987 |
| DE | 37 34 363 A1 | 4/1989 |
| DE | 39 03 652 C2 | 8/1990 |
| DE | 41 29 515 A1 | 3/1993 |
| DE | 44 00 910 A1 | 7/1995 |
| DE | 4400910 A1 | 7/1995 |
| DE | 4446741 A1 | 6/1996 |
| DE | 195 40 631 A1 | 5/1997 |
| DE | 19633011 A1 | 2/1998 |
| DE | 19725899 A1 | 12/1998 |
| DE | 19803448 A1 | 8/1999 |
| EP | 0 631 901 A1 | 1/1995 |
| EP | 0751030 A1 | 1/1997 |
| WO | WO93/08410 A1 | 4/1993 |

OTHER PUBLICATIONS

U.S. Patent application No. 09/831,434 filed May 23, 2001 entitled *Seat Height Adjuster Drive for a Vehicle Seat*.

* cited by examiner

Primary Examiner—Carl D. Friedman
Assistant Examiner—Brian E. Glessner
(74) Attorney, Agent, or Firm—Alston & Bird LLP

(57) ABSTRACT

In a stepping mechanism for a vehicle seat, in particular for an automobile seat, with a gear and a pivoting pawl that is adapted for pivoting toward the gear and rotating the gear upon engagement, a friction spring is provided for raising the pawl from the gear.

21 Claims, 4 Drawing Sheets

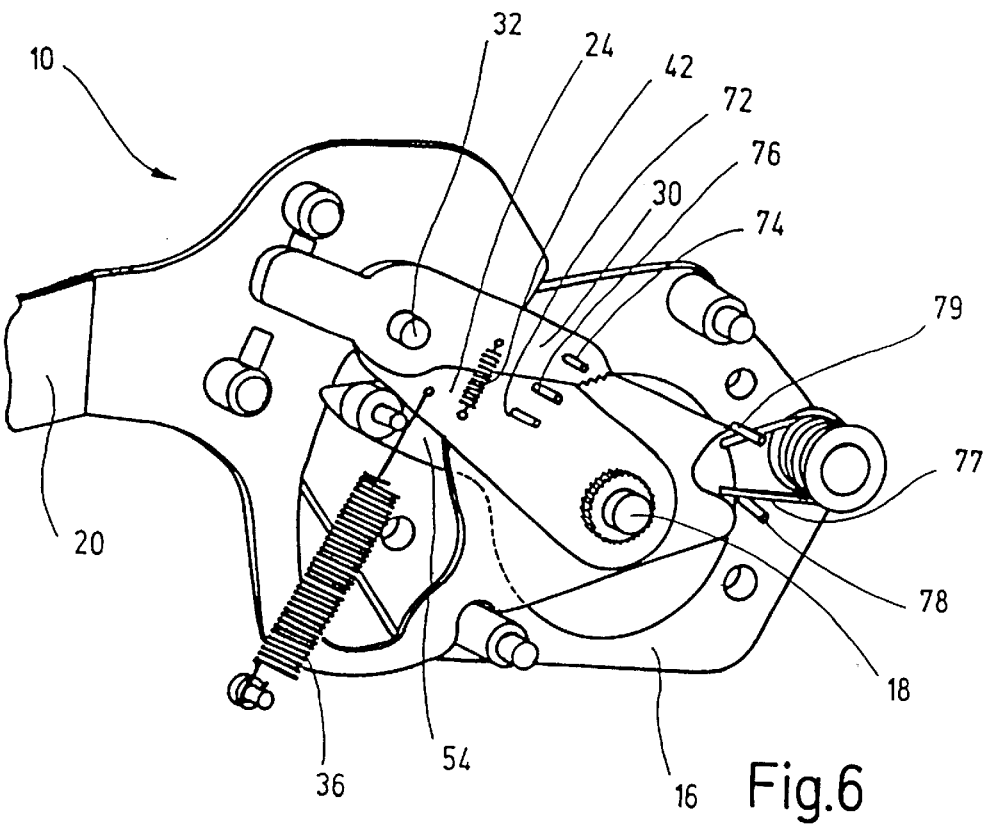
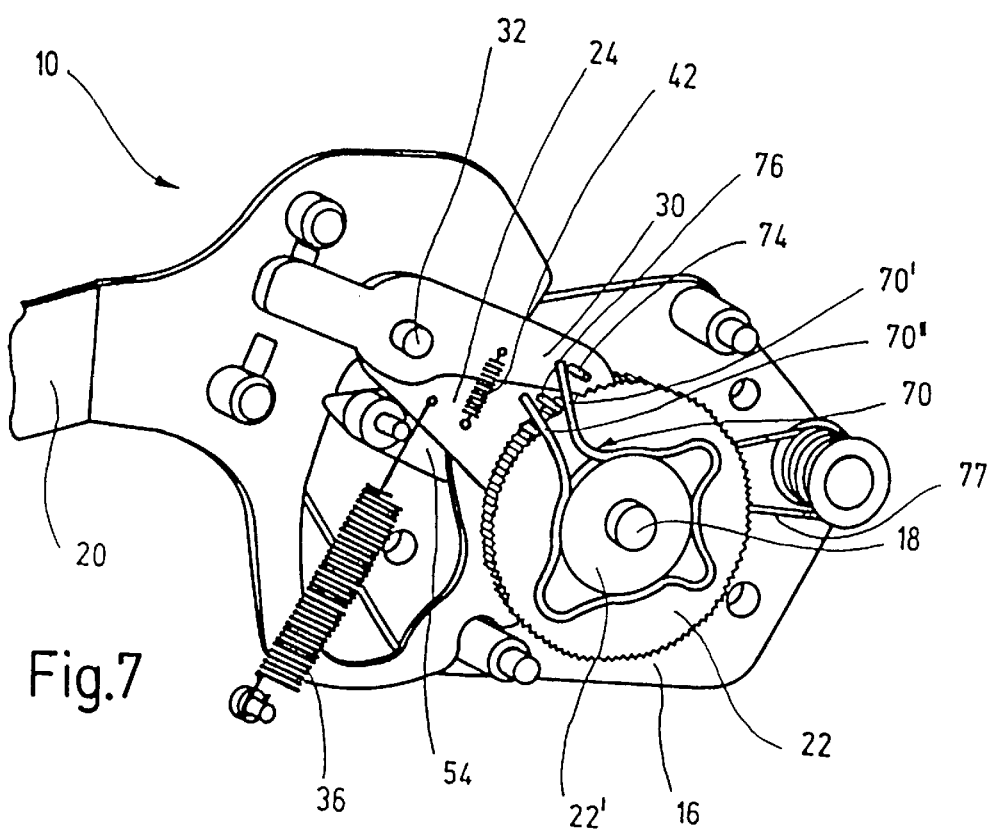

STEPPING MECHANISM FOR AN AUTOMOBILE SEAT

BACKGROUND OF THE INVENTION

The invention relates to a stepping mechanism for adjusting a vehicle seat, in particular for adjusting an automobile seat.

DE 44 00 910 A1 discloses a known stepping mechanism which is designed and constructed as a drive for a seat height adjuster, and which enables a pumping motion of a manually actuatable lever symmetrically in both directions of adjustment. As a result, a shaft is driven, which in turn adjusts the seat structure of the vehicle seat by means of gearing. During the pumping motion of the lever, a force is transmitted by means of a pawl, which engages a gear. At the same time, a freewheel is released, which prevents the shaft from rotating back in the blocked direction. When returning the lever from its deflected position to its idle position, the pawl is able to disengage from the gear, and to slide over the teeth of the gear. This disadvantageously results in a disturbing noise, a so-called "rattle."

SUMMARY OF THE INVENTION

In accordance with one aspect of the present invention, an improved stepping mechanism is provided. The stepping mechanism includes a gear mounted for rotating relative to a housing. The stepping mechanism also includes a pawl that is operative for being pivoted toward and engaged to the gear. The pawl is also operative for rotating the gear while engaged thereto. In addition, the pawl is operative for moving along and relative to the gear. A body of the stepping mechanism is mounted for rotating in response to the rotating of the gear. The stepping mechanism also includes a friction spring that extends at least partially around the body for frictionally engaging the body. The friction spring is operative for releasing the pawl from the gear and keeping the pawl substantially away from the gear while the pawl is moving along and relative to the gear, so that contact between the pawl and the gear is restricted while the pawl is moving along and relative to the gear.

As a result of providing the friction spring, by which the pawl can be released from the gear, it is possible to return the below-discussed manually actuable lever of the stepping mechanism noiselessly, i.e., without the aforesaid "rattle." The use of the friction spring is not limited to a stepping mechanism. It may be used in any mechanism in which it is desirable to quietly move toothed surfaces past one another.

Preferably, the body about which the friction spring loops is a step of the gear or a shaft that does not rotate relative to the gear, but that does rotate with the gear, so that the friction spring can be carried along by the gear. It is advantageous and preferred for the friction spring to define a flat curved shape, so that the friction spring is not too sensitive to tolerances. According to one example in which the friction spring defines a flat curve, the friction spring includes radially outward directed bulges and lies in line contact against the step only in intermediate ranges.

In a preferred embodiment, the pawl is movable by a manually actuatable lever that is pivotably mounted. Preferably, the pawl is pivotably connected to a guide bar that is mounted to be capable of pivoting coaxially with the lever. As a result, the pawl is movable at least in part independently of the lever. This independent movability allows the friction spring to raise the pawl. Additionally, the lever has available a mechanism for releasing, for example, a stop. Furthermore, this also presents the possibility of realizing a simple antirotation device. The friction spring may be designed and constructed such that it opens, for example, when entrained by the guide bar, that it closes upon contact with the pawl, and that it is tightened to a certain degree, i.e., it does not move due to frictional interaction with the body about which it loops. Depending on the geometric design of the ends of the friction spring, it may be entrained by the guide bar always at the same end or at the end leading in the direction of rotation. A simple-to-make means for entraining the friction spring includes stops on the pawl and the guide bar, for example in the form of screwed-in pins.

A preferred application of the stepping mechanism according to the invention is a drive for a seat height adjuster, wherein the automobile seat is raised upward in a pumping motion by means of the lever. The downward directed adjustment of the automobile seat occurs by a downward movement, which is released, for example, by the lever. The downward movement may then occur in one step assisted only by the force of weight. In comparison with the state of the art, a greater angular freedom of the lever is available for the upward pumping motion. This allows for the number of the necessary strokes of the lever to be selectively decreased, or for the transmission via the lever to be increased. In the latter instance, a smaller lever force is to be applied, and absorbency relative to crash forces is increased. As a stop, a freewheel is able to prevent an unwanted rotation of a shaft of the drive for the seat height adjuster. If the shaft is caused to rotate due to vibrational loads, the pawl can serve at the same time as an antirotation device.

BRIEF DESCRIPTION OF THE DRAWINGS

In the following, the invention is described in greater detail with reference to embodiments illustrated in the drawings, in which:

FIG. 6 is a partial view of FIG. 2 without the gear and friction spring; and

FIG. 7 shows a modification of the embodiment.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
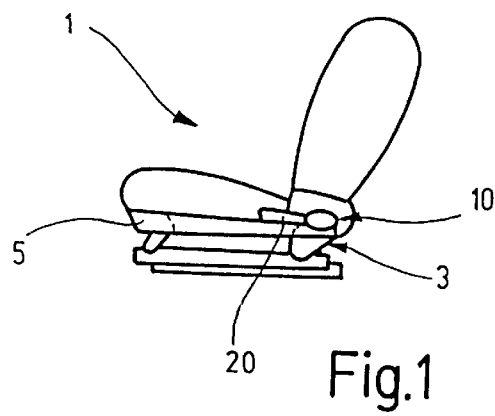
FIG. 1 is a side view of an automobile seat with a stepping mechanism of an embodiment of the present invention.

An embodiment illustrated in FIGS. 1–6 will now be described. Referring to FIG. 1, a vertically adjustable seat 1 of an automobile includes a seat support 3. The seat support 3 is infinitely variable by hand as regards the seat height by means of a stepping mechanism 10 that is designed and constructed as a drive for a seat height adjuster. The stepping mechanism 10 includes a pinion 12 (FIGS. 3–4), which operatively connects via a shaft (not shown) to a movable part of seat support 3. The pinion 12 is supported with a cylindrical section integral therewith, via a freewheel described in greater detail below, in a housing plate 16. The housing plate 16 is connected, for example, to a seat frame 5 of seat support 3. By rotating the shaft relative to the housing plate 16, the seat height is changed.

Figure 2:
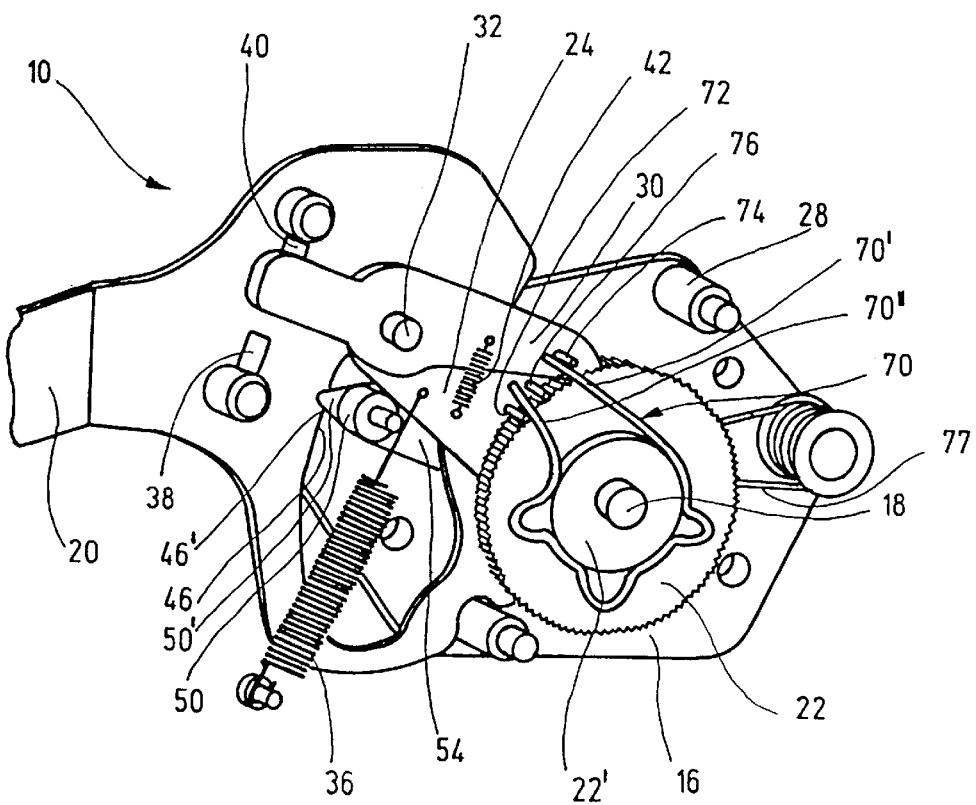
FIG. 2 is a partial view of the embodiment without a housing cover from the outer side of the automobile seat.

Referring primarily to FIG. 2, on its outward directed front end, the pinion 12 includes a pin 18 in alignment therewith. This pin 18 extends via housing plate 16 to the outside of automobile seat 1. Over its length, the pin 18 successively includes a first smooth section, a second smooth section, and a toothed section, with a further smooth section following toward its free end. The first smooth section of pin 18 mounts for pivotal movement a lever 20. The lever 20 extends forward in the driving direction and is accessible to the hand of the user of automobile seat 1. On the toothed section of pin 18, a gear 22 is slipped on, which is thereby connected to pinion 12 for rotation therewith. The second smooth section of pin 18, namely between the lever 20 and gear 22, mounts for pivotal movement an elongate guide bar 24 at its one end. The end of pin 18 is supported in a housing cover 26 (FIG. 5), which is arranged via spacer pins 28 parallel to the housing plate 16 and secured thereto.

A pawl 30 is pivotably connected via a connecting pin 32 to the other end of guide bar 24. The pawl 30, which is designed and constructed in the fashion of a lever, includes downward directed teeth at its rear end. With these teeth, the pawl 30 normally engages gear 22 from the top. The pawl 30 and gear 22 extend in the same plane. Normally, the connecting pin 32 lies in an indent 34 (FIG. 5) in the upper side of housing cover 26. A lower spring 36 is arranged with its one end on guide bar 24 in a location between connecting pin 32 and pin 18, and with its other end on housing cover 26 for keeping connecting pin 32 in contact with housing cover 26.

Figure 3:
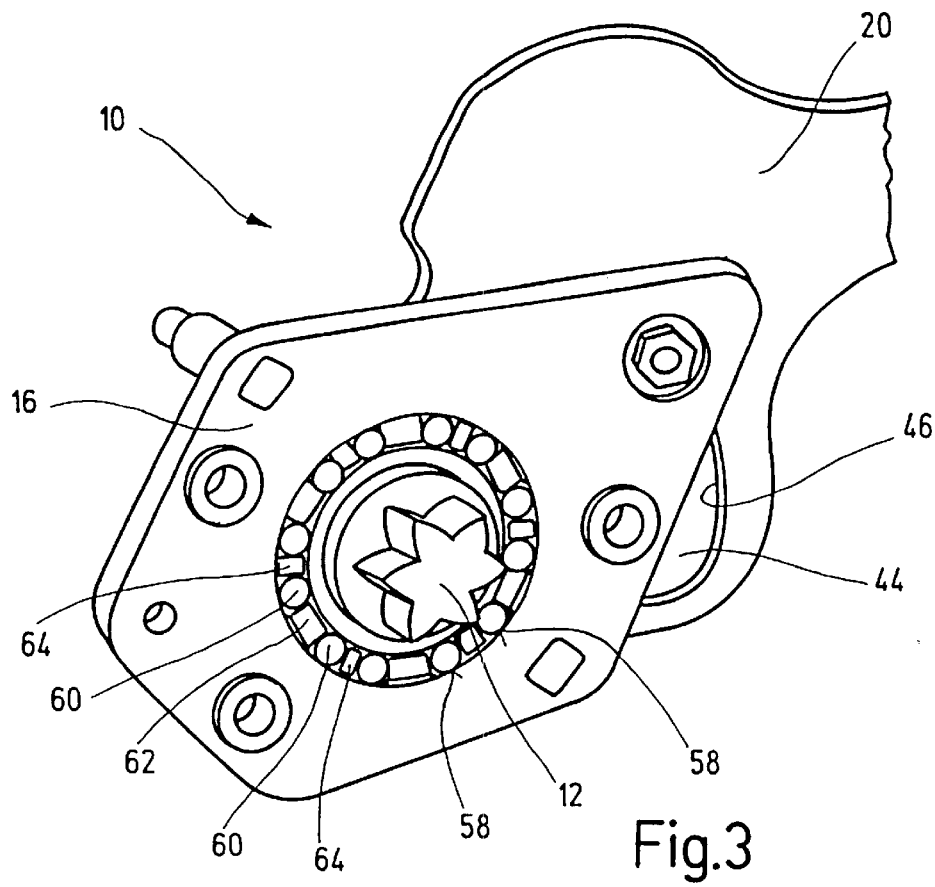
FIG. 3 is a partial view of the embodiment without the housing cover from the inner side of the automobile seat.

The lever 20 includes upper and lower entraining elements 38 and 40, which are arranged in the region of the end of pawl 30 facing away from the teeth, and which are formed, for example by pins. An upper spring 42 is arranged with its one end on pawl 30 in a location between connecting pin 32 and the end of pawl 30 facing the teeth, and with its other end on guide bar 24 for keeping the pawl 30 in contact with gear 22 and in contact with upper entraining element 40. Furthermore, in the region between its bearing point on pin 18 and entraining elements 38 and 40, the lever 20 includes a large opening 44 (FIGS. 3–4), whose edge facing away from pin 18 is designed and constructed as a guide track 46 (FIGS. 3–4).

Figure 4:
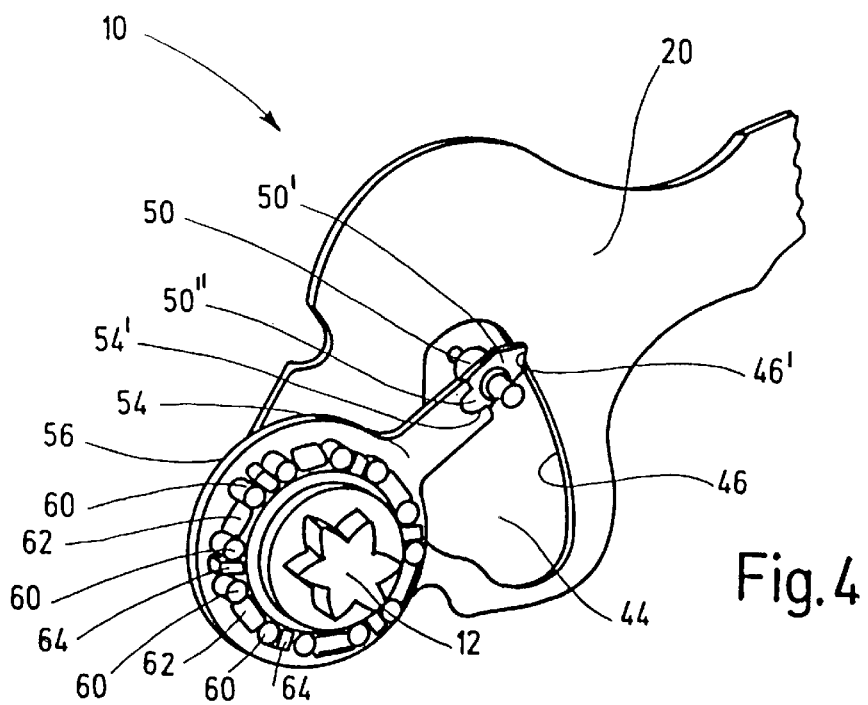
FIG. 4 is a partial view of FIG. 3 without a housing plate, gear, pawl, and guide bar.
Figure 5:
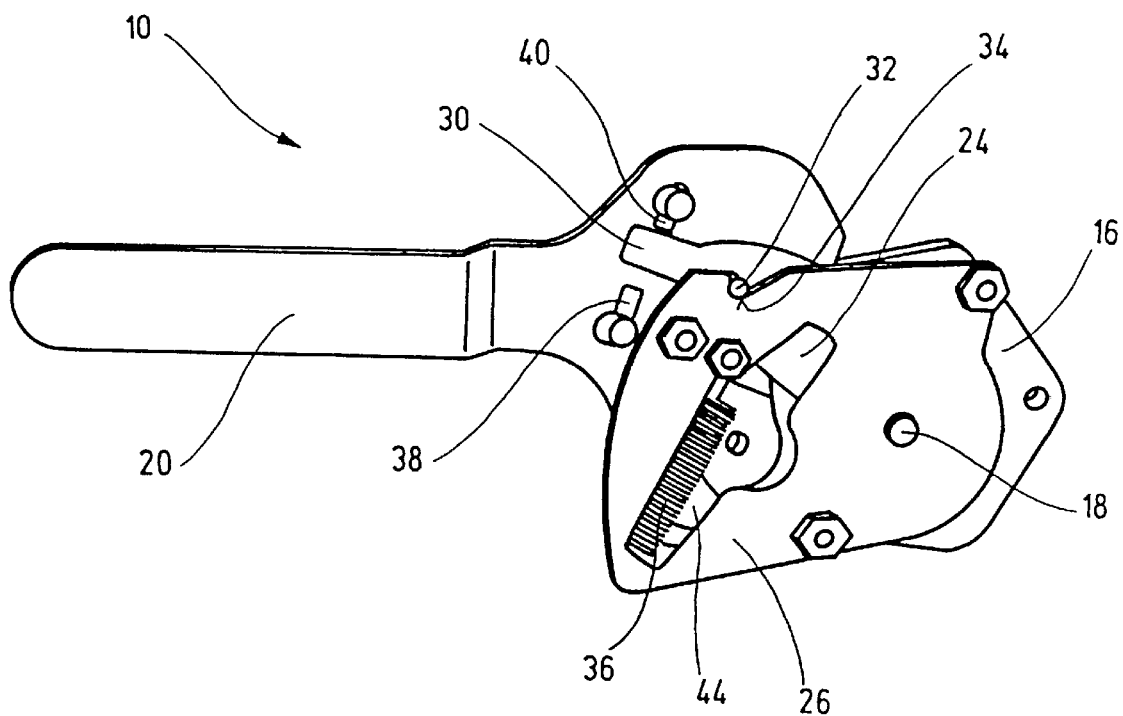
FIG. 5 is a side view of the embodiment from the outer side of the automobile seat, with the housing cover, but without a leg spring for the idle position.

Referring to FIG. 4, a switch 50 pivotably carried by the housing plate 16 includes two cams 50' and 50", which extend transversely to the axis of rotation of the switch. In an idle position of switch 50, the cam 50' lies in a small, V-shaped cavity 46' of guide track 46. The opposite cam 50" engages with one lateral pin a slot 54' in an arm 54 of a plate cam 56. The plate cam 56 is supported on the first smooth section of pin 18 between lever 20 and housing plate 16.

Referring to FIG. 4, the freewheel includes operative surfaces 58, which are formed on housing plate 16 in the inner circumference of the opening surrounding the cylindrical portion of pinion 12, and which extend perpendicularly or slightly obliquely to the radius of the opening. Between the housing plate 16 and the cylindrical portion of pinion 12, six pairs of braking rolls 60 extend in the circumferential direction. Each pair of braking rolls 60 is arranged in the circumferential direction of pinion 12 in the region of the two sides of one operative surface 58. Between two braking rolls 60, an elastic element 62 is arranged away from the operative surface 58. Referring to FIG. 4, toward the other side, an entraining element 64 of plate cam 56 is arranged in the circumferential direction between two braking rolls 60. In cooperation with the operative surfaces 58, the braking rolls 60 of each pair block respectively in one of the two directions of rotation of the shaft. When the arm 54 of plate cam 56 is moved, i.e., the freewheel releases, the entraining elements 64 will push respectively one braking roll 60 away from operative surface 58, so that the shaft is capable of rotating against the direction of rotation of arm 54 associated to plate cam 56.

The cavity 46' of guide track 46 is asymmetrically provided within guide track 46. Thus, with respect to pin 18 as a bearing point of lever 20, the angle between cavity 46' and the upper edge of opening 44 is somewhat more than 3° to 7°, whereas the angle between cavity 46' and the lower edge of opening 44 amounts to somewhat more than 43° to 47°. Consequently, the lever 20 passes in the two different pivoting directions over different sector ranges, thereby performing different strokes. Two of the spacer pins 28 between housing plate 16 and housing cover 26 are arranged such that during a movement of lever 20, same reaches first the spacer pins 28, which act as end stops, before switch 50 arrives at the edge of opening 44.

A friction spring 70 (or loop spring) loops once (or several times) about a step 22' of gear 22. The step 22' can also be characterized as a shaft that is connected to the gear 22. A front end 70' of friction spring 70 and a rear end 70" of friction spring 70 arranged next thereto are bent radially outward from this step 22' of gear 22. Furthermore, along this loop, the friction spring 70 includes three radially outward directed bulges, which realize a flat curve of friction spring 70, so that same is not too sensitive to tolerances, when accordingly biased. Furthermore, the bulges define a better contact of friction spring 70. The best defined contact is reached when the loop of friction spring 70 has the general shape of a polygon and is in line contact with the step 22' of gear 22. However, other arrangements are also within the scope of the present invention.

When the lever 20 is manually pulled upward from its idle position, the cam 50' of switch 50 is entrained by guide track 46. The pivotal movement of switch 50 and its additional cam 50" causes arm 54 of plate cam 56 to move via the slot-pin connection. The plate cam 56 rotates in the direction opposite from the direction of rotation of lever 20, thereby releasing via its entraining elements 64 those braking rolls 60 of the freewheel which block together with operative surfaces 58 in the pivoting direction of lever 20, i.e., it releases the freewheel.

The lever 20 is now able to perform a large stroke. The switch 50 remains in its pivoted position and slides along guide track 46. In so doing, the lever 20 entrains pawl 30 via its lower entraining element 38. The connecting pin 32 removes itself from indent 34. Since the pawl 30 is connected via guide bar 24 to the same pin 18, which mounts gear 22, and since it engages or comes to engage gear 22, the pawl 30 is able to rotate gear 22 in formfitting engagement therewith over a certain distance in the pivoting direction of lever 20. The shaft engaging gear 22 is able to rotate accordingly in the same direction, i.e., the drive of the seat height adjuster 10 moves seat support 3 upward.

When the pawl 30 already engages gear 22 in its idle position, the pawl 30 will immediately move gear 22, which entrains with its step 22' friction spring 70 by frictional engagement therewith. At the same time, the guide bar 24 entrains, via a first stop 72, friction spring 70 by its rear end 70". When the pawl 30 does not engage gear 22 in its idle position, the bar 24 is not yet in contact with friction spring 70, i.e., the friction spring 70 remains inactive, and pawl 30 engages. Once the pawl 30 is engaged, it will entrain friction spring 70 via gear 22 and its step 22', and the guide bar 24 contacts with its first stop 72 friction spring 70 and entrains it in addition.

As soon as lever 20 contacts one of spacer pins 28 between housing plate 16 and housing cover 26 after a long stroke, it is necessary to return lever 20, namely to move it again downward. The guide bar 24 being biased by lower spring 36 removes itself with its first stop 72 from the rear end 70" of friction spring 70. The front end 70' of friction spring 70 pushes, via a second stop 74 upon pawl 30. In so doing, the torque of friction spring 70 increases at the same time, in that the loop of friction spring 70 tightens, i.e. the friction spring 70 continues to close.

The pawl 30 pivots about connecting pin 32 and disengages from gear 22. The geometric configuration of the front end 70' of the friction spring permits adjusting the lifting kinematics. The lifting of pawl 30 is limited in that the guide bar 24 mounting a third stop 76 comes into contact with the rear end 70" of friction spring 70 and entrains same. In so doing, the torque of friction spring 70 decreases by bending open the loop of friction spring 70, i.e., by further opening friction spring 70. This facilitates the return of lever 20.

The freewheel prevents the shaft from rotating back from its reached position under the torque that is operative on the driven end based on the weight. The lower spring 36 returns the guide bar 24 to its starting position, while the pawl 30 remains disengaged. This avoids a development of noise ("rattling") as the pawl 30 moves along gear 22. If the gear 22 starts to rotate because of vibrational stresses, the friction spring 70 will slide with its front end 70' away from pawl 30. The pawl 30 comes to engage again gear 22 by means of upper spring 42, and then operates as an antirotation device.

The connecting pin 32 is again moved toward indent 34. As soon as the cam 50' of switch 50 enters cavity 46' of guide track 46, the switch 50 will rotate back. This causes arm 54 of plate cam 56 to move back, which blocks the freewheel by displacing braking rolls 60. The freewheel again blocks the shaft even in the just-driven direction. By repeating the described sequences of motion several times, a pumping motion will result for raising the seat frame 3.

A leg spring 77 (FIGS. 2 and 6–7) returns lever 20 to its defined idle position. In so doing, the legs of spring 77 that are stayed relative to each other respectively lie against a fourth and fifth stop 78 and 79 of housing plate 16 and against lever 20.

Supported on guide bar 24, the upper spring 42 will keep pawl 30 in engagement with gear 22, unless it is raised by friction spring 70 or lever 20. For purposes of raising the pawl 30 by friction spring 70, the torque of friction spring 70 is greater than the torque that upper spring 42 develops on pawl 30 at its point of engagement. The lower spring 36 pulls back guide bar 24 together with pawl 30 against the torque of friction spring 70, until the connecting pin 32 lies in indent 34 of housing cover 16. For this reason, the lower spring 36 is designed such that it generates at any time a greater torque around pin 18 than friction spring 70.

When the lever 20 is manually pushed downward from its idle position, the switch 50 will be rotated likewise in this direction. Via the slot-pin connection, the arm 54 of plate cam 56 is again rotated, which releases again the freewheel in the direction of the pivotal movement of lever 20. Based on the shorter portion of guide track 46, the lever 20 is able to perform only a short stroke. In so doing, the lever 20 comes with its upper entraining element 40 into contact with pawl 30. Since the connecting pin 32 lies in indent 34, the pawl 30 starts with a pivotal movement about connecting pin 32. As a result, the pawl 30 disengages from gear 22, thereby permitting the shaft to rotate. Due to the weight of the automobile seat 1 and of the seat user, the seat support 3 moves downward. As soon as the lever 20 is again released, the components will return to their starting position. In particular, the plate cam 56 blocks again the freewheel.

In a modified embodiment illustrated in FIG. 7, the first stop 72 is omitted, and, depending on the direction of rotation, the guide bar 24 entrains with the third stop 76 the front end 70' or the rear end 70" of friction spring 70. During the entrainment, the friction spring 70 opens, so that the torque of the friction spring is reduced. During the lifting of pawl 30, the friction spring 70 tightens, so that the desired friction serving the support increases. In this modification, the decrease of the torque occurs in both directions of rotation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. Stepping mechanism for a vehicle seat, comprising:
   a housing;
   a gear mounted for rotating relative to the housing;
   a pawl operative for being pivoted toward and engaged to the gear, operative for rotating the gear while engaged to the gear, and operative for moving along and relative to the gear;
   a body mounted for rotating in response to the rotating of the gear; and
   a friction spring extending at least partially around the body, with the friction spring including opposite ends, a length extending between the ends, and a plurality of bulges that are positioned along the length, wherein the bulges are spaced apart from the ends and extend radially outward, each bulge is defined by more than one bend in the length of the friction spring, and a part of the length of the friction spring that is positioned between two of the bulges frictionally engages the body, wherein the friction spring is operative for applying a force to the pawl while the pawl is moving along and relative to the gear, and wherein the force is applied so that contact between the pawl and the gear is restricted while the pawl is moving along and relative to the gear.

2. Stepping mechanism of claim 1, wherein the body is a step of the gear and the friction spring loops at least partially around the step.

3. Stepping mechanism of claim 1, wherein the body is a shaft that is connected to the gear and the friction spring loops at least partially around the shaft.

4. Stepping mechanism of claim 2, wherein the part of the friction spring that is positioned between two of the bulges is in line contact with the step of the gear.

5. Stepping mechanism of claim 1, further comprising a manually actuatable lever that is operative for moving the pawl.

6. Stepping mechanism of claim 5, further comprising a bar that is mounted for pivoting about an axis, wherein the lever is mounted for pivoting about the axis, and the pawl is mounting for pivoting relative to the bar so that the pawl is capable of moving independently of the lever.

7. Stepping mechanism of claim 6, wherein the bar entrains the friction spring to at least partially open the friction spring, and the friction spring is at least partially closed by contact between the friction spring and the pawl.

8. Stepping mechanism of claim 7, wherein the pawl includes a stop and the contact between the friction spring and the pawl is contact between the stop and an end region of the friction spring.

9. Stepping mechanism of claim 7, wherein the bar includes a stop and the stop and an end region of the friction spring are in contact while the bar is entraining the friction spring.

10. Stepping mechanism of claim 1, in combination with:
a seat support of a vertically adjustable automobile seat, wherein the stepping mechanism is connected to the seat support for adjusting the height of the automobile seat.

11. The combination of claim 10, wherein the stepping mechanism further comprises a manually actuatable lever, and the stepping mechanism is operative so that upward adjustment of the automobile seat occurs in a pumping motion by means of repeated manual operation of the lever in a first manner, and downward adjustment of the automobile seat proceeds via a downward movement that is allowed by means of manual operation of the lever in a second manner.

12. Stepping mechanism of claim 1, wherein each of the ends of the friction spring extend radially outward.

13. Stepping mechanism of claim 1, wherein the plurality of bulges includes more than two bulges.

14. Stepping mechanism of claim 1, wherein the part of the friction spring that is positioned between two of the bulges is in line contact with the body.

15. Stepping mechanism for a vehicle seat, comprising:
a housing;
a gear mounted for rotating relative to the housing;
a pawl operative for being pivoted toward and engaged to the gear, operative for rotating the gear while engaged to the gear, and operative for moving along and relative to the gear;
a body mounted for rotating in response to the rotating of the gear;
a friction spring extending at least partially around the body for frictionally engaging the body, wherein the friction spring is operative for applying a force to the pawl while the pawl is moving along and relative to the gear, and wherein the force is applied so that contact between the pawl and the gear is restricted while the pawl is moving along and relative to the gear;
a manually actuatable lever that is mounted for pivoting about an axis and operative for moving the pawl; and
a bar that is mounted for pivoting about the axis, wherein the pawl is mounting for pivoting relative to the bar so that the pawl is capable of moving independently of the lever, the bar entrains the friction spring to at least partially open the friction spring, and the friction spring is at least partially closed by contact between the friction spring and the pawl, and wherein the pawl includes a stop and the contact between the friction spring and the pawl is contact between the stop and an end region of the friction spring.

16. Stepping mechanism of claim 15, in combination with:
a seat support of a vertically adjustable automobile seat, wherein the stepping mechanism is connected to the seat support for adjusting the height of the automobile seat, and the stepping mechanism is operative so that upward adjustment of the automobile seat occurs in a pumping motion by means of repeated manual operation of the lever in a first manner, and downward adjustment of the automobile seat proceeds via a downward movement that is allowed by means of manual operation of the lever in a second manner.

17. Stepping mechanism of claim 15, wherein the end region of the friction spring extends radially outward and the friction spring further includes bulges that are directed radially outward.

18. Stepping mechanism for a vehicle seat, comprising:
a housing;
a gear mounted for rotating relative to the housing;
a pawl operative for being pivoted toward and engaged to the gear, operative for rotating the gear while engaged to the gear, and operative for moving along and relative to the gear;
a body mounted for rotating in response to the rotating of the gear;
a friction spring extending at least partially around the body for frictionally engaging the body, wherein the friction spring is operative for applying a force to the pawl while the pawl is moving along and relative to the gear, and wherein the force is applied so that contact between the pawl and the gear is restricted while the pawl is moving along and relative to the gear;
a manually actuatable lever that is mounted for pivoting about an axis and operative for moving the pawl; and
a bar that is mounted for pivoting about the axis, wherein the pawl is mounting for pivoting relative to the bar so that the pawl is capable of moving independently of the lever, the bar entrains the friction spring to at least partially open the friction spring, and the friction spring is at least partially closed by contact between the friction spring and the pawl, and wherein the bar includes a stop and the stop and an end region of the friction spring are in contact while the bar is entraining the friction spring.

19. Stepping mechanism of claim 18, in combination with:
a seat support of a vertically adjustable automobile seat, wherein the stepping mechanism is connected to the seat support for adjusting the height of the automobile seat, and the stepping mechanism is operative so that upward adjustment of the automobile seat occurs in a pumping motion by means of repeated manual operation of the lever in a first manner, and downward adjustment of the automobile seat proceeds via a downward movement that is allowed by means of manual operation of the lever in a second manner.

20. Stepping mechanism of claim 18, wherein the end region of the friction spring extends radially outward and the friction spring further includes bulges that are directed radially outward.

21. Stepping mechanism of claim 18, wherein the stop is a first stop, the end region of the friction spring is a first end region, and the entraining is a first entraining that occurs in a first direction, and wherein the bar includes a second stop that contacts a second end region of the friction spring while the bar entrains the friction spring in a second direction.

* * * * *